United States Patent
Zeller (10) Patent No.: US 12,535,546 B2
(45) Date of Patent: Jan. 27, 2026

(54) IMAGE DATA CREATION USING MAGNETIC RESONANCE

(71) Applicant: Siemens Healthcare GmbH, Erlangen (DE)

(72) Inventor: Mario Zeller, Erlangen (DE)

(73) Assignee: Siemens Healthineers AG, Erlangen (DE)

( * ) Notice: Subject to any disclaimer, the term of this patent is extended or adjusted under 35 U.S.C. 154(b) by 167 days.

(21) Appl. No.: 18/374,719

(22) Filed: Sep. 29, 2023

(65) Prior Publication Data

US 2024/0111011 A1    Apr. 4, 2024

(30) Foreign Application Priority Data

Sep. 30, 2022   (DE) ................. 10 2022 210 432.3

(51) Int. Cl.
| | | |
|---|---|---|
| G01V 3/00 | (2006.01) | |
| G01R 33/54 | (2006.01) | |
| G01R 33/56 | (2006.01) | |
| G06T 11/00 | (2006.01) | |

(52) U.S. Cl.
CPC ....... *G01R 33/5608* (2013.01); *G01R 33/543* (2013.01); *G06T 11/005* (2013.01); *G06T 11/006* (2013.01)

(58) Field of Classification Search
CPC .............. G01R 33/287; G01R 33/4835; G01R 33/5608; A61B 2090/374
USPC .......................................................... 324/309
See application file for complete search history.

(56) References Cited

U.S. PATENT DOCUMENTS

2018/0348323 A1*  12/2018  Carinci .............. G01R 33/3852

FOREIGN PATENT DOCUMENTS

| CN | 104414641 A | * | 3/2015 | ............. A61B 5/055 |
| CN | 111681296 A | * | 9/2020 | ............ G06F 18/253 |
| DE | 10250922 B4 | * | 1/2008 | ....... G01R 33/56341 |

OTHER PUBLICATIONS

JP H10276999 A (Tezuka) (Year: 1998).*
Hammernik, Kerstin et al.: "Systematic Evaluation of Iterative Deep Neural Networks for Fast Parallel MRI Reconstruction with Sensitivity? Weighted Coil Combination," Magnetic Resonance in Medicine 86.4 (2021):1859-1872.
Blaimer M. et al.: "SMASH, SENSE, PILS, GRAPPA How to Choose the Optimal Method", Top Magn Respn Imaging, vol. 15,No. 4, Aug. 2004.
Breuer, Felix A. et al.: "Controlled Aliasing in Parallel Imaging Results in Higher Acceleration (CAIPIRINHA) for Multi-Slice Imaging"; in: Magnetic Resonance in Medicine 53: S. 684-691 (2005); 2005.

(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

A method for creating image data of an examination object using a magnetic resonance system, including: acquiring a first and at least a second set of measurement data at least of one slice, wherein during each acquisition of measurement data different acceleration factors and/or different field of view shift factors are used; and reconstructing image data based on the acquired sets of measurement data.

11 Claims, 3 Drawing Sheets

(56) References Cited

OTHER PUBLICATIONS

Knoll Florian et al.: "Deep-Learning Methods for Parallel Magnetic Resonance Imaging Reconstruction: A Survey of the Current Approaches, Trends, and Issues"; IEEE Signal Processing Magazine, IEEE Service Center, Piscataway, NJ, US; vol. 37, No. 1, Jan. 1, 2020 (Jan. 1, 2020); pp. 128-140, XP011767148.
Seidel Philipp et al.: "Temporal Signal-to-Noise Changes in Combined Multisliceand In-Plane-Accelerated Echo-Planar Imaging With a 20-and 64-Channel Coil" Scientific Reports, https://doi.org/10.1038/s41598-020-62590-y, 10. Jg., Nr. 1, S. 1-9.; 2020.
Embleton Karl V et al.: "Distortion Correction for Diffusion-Weighted MRI Tractography and fMRI in the temporal lobes"; Human brain mapping; 2010; 31. Jg., Nr. 10, S. 1570-1587.
Setsompop, Kawin, et al. "Blipped?controlled aliasing in parallel imaging for simultaneous multislice echo planar imaging with reduced g?factor penalty." Magnetic resonance in medicine 67.5 (2012): 1210-1224.; 2012.
Hammernik K. et al.: "Learning a Variational Network for Reconstruction of Accelerated MRI Data", arXiv:1704.00447v1 [cs.CV] Apr. 3, 2017.
Burakiewicz Jedrzej et al.: "Water-Fat Separation In Diffusion-Weighted EPI Using an IDEAL Approach With Image Navigator", Magnetic resonance in medicine; 2015, 73. Jg., Nr. 3, S. 964-972.

\* cited by examiner

IMAGE DATA CREATION USING MAGNETIC RESONANCE

TECHNICAL FIELD

The disclosure relates to a method for creating image data using magnetic resonance.

BACKGROUND

The magnetic resonance technique (referred to below by the abbreviation MR for magnetic resonance) is a known technique with which images of the interior of an examination object can be generated. Expressed simply, the examination object is positioned for this purpose in a magnetic resonance device in a comparatively strong static, homogeneous basic magnetic field, also referred to as $B_0$ field, with field strengths of 0.2 Tesla to 7 Tesla and more, so that its nuclear spins are oriented along the basic magnetic field. To trigger nuclear spin resonances, which can be measured as signals, radio-frequency excitation pulses (RF pulses) are radiated into the examination object; the triggered nuclear spin resonances are measured as so-called k-space data, and on the basis thereof, MR images are reconstructed, or spectroscopy data is determined. For the location coding of the measurement data, rapidly switched magnetic gradient fields, known as gradients, are superimposed on the basic magnetic field. One scheme that is used and describes a temporal sequence of RF pulses that are to be radiated and gradients that are to be switched is referred to as a pulse sequence (scheme) or, in short, also as a sequence. The acquired measurement data is digitalized and stored as complex number values in a k-space matrix. It is possible to use a multi-dimensional Fourier transformation, for example, to reconstruct an associated MR image from the k-space matrix storing values.

In order in the case of MR measurements to improve the signal-to-noise ratio (SNR) or reduce the sensitivity of the measurement to movement and/or flow, it is already usual in the case of many acquisitions to acquire measurement data multiple times to be able to average the measurement data or, for example, to average the reconstructed image data (averaging).

The desire for ever-quicker MR images in the clinical field leads to a renaissance of methods in which multiple images are acquired simultaneously. In general, these methods can be characterized in that at least during a part of the measurement transverse magnetization of at least two slices is purposefully used simultaneously for the imaging process ("multi-slice imaging," "slice multiplexing"). In contrast, in the case of established "multi-slice imaging," the signal from at least two slices is received in an alternating manner, in other words, entirely independently of one another with a corresponding longer measurement time.

Known methods for this purpose are, for example, the so-called Hadamard coding, methods with simultaneous echo refocusing, methods with broadband data acquisition, or also methods that use parallel imaging in the slice direction. The latter-mentioned methods include, for example, also the CAIPIRINHA technique as described by Breuer et al. in "Controlled Aliasing in Parallel Imaging Results in Higher Acceleration (CAIPIRINHA) for Multi-Slice Imaging," Magnetic Resonance in Medicine 53, 2005, pages 684-691, and the blipped CAIPIRINHA technique as is described by Setsompop et al. in "Blipped-Controlled Aliasing in Parallel Imaging for Simultaneous Multislice Echo Planar Imaging With Reduced g-Factor Penalty," Magnetic Resonance in Medicine 67, 2012, pages 1210-1224.

In particular, in the case of the latter-mentioned slice multiplexing method, a so-called multi-band RF pulse is used to excite or otherwise manipulate, for example, to refocus or to saturate, two or more slices simultaneously. Such a multi-band RF pulse is, in this case, a multiplex of individual RF pulses, which would be used to manipulate the individual slices, which are to be manipulated simultaneously. By multiplexing, a baseband-modulated multi-band RF pulse, for example, is obtained by adding the pulse shapes of the individual RF pulses. In this case, the location coding of the received signals is essentially achieved by a common gradient circuit in two directions (two-dimensional gradient coding).

The signals created are received from all excited slices collapsed in one data set using multiple receiving antennae and then separated with the aid of parallel acquisition techniques according to the individual slices.

The aforementioned parallel acquisition techniques (ppa techniques), with the aid of which the acquisition times generally required for acquiring the desired data can be shortened by incomplete sampling according to Nyquist, in other words, undersampling of the k-space, include, for example, GRAPPA ("GeneRalized Autocalibrating Partially Parallel Acquisition") and SENSE ("SENSitivity Encoding"). The undersampling leads to so-called aliasing artifacts, which must be compensated for when reconstructing image data. Such de-aliasing can take place in the k-space or the image space. For example, in GRAPPA methods, de-aliasing of the undersampled acquired measurement data is performed in the k-space, hence it is also called k-space based. SENSE methods, for example, lead to a de-aliasing of the undersampled acquired measurement data in the image space and are therefore also referred to as image space-based. The degree of undersampling can be specified via a so-called acceleration factor, wherein in the case of an acceleration factor of two, R=2, half, in the case of an acceleration factor of R=3 one third, etc., of the measurement data is acquired.

The measurement points that are not measured in the k-space within the framework of undersampling are usually evenly distributed over the k-space, which is to be measured according to Nyquist in the case of parallel acquisition techniques so that, for example, every second k-space row is measured. Furthermore, the "missing" k-space data in the case of parallel acquisition techniques is reconstructed with the aid of coil sensitivity data. This coil sensitivity data of the receiver coils, used when acquiring the measurement data, is determined from reference measurement data, which samples at least one area of the k-space to be measured, mainly the central area, entirely according to the Nyquist condition. An overview of different ppa techniques can be found, for example, in the article by Blaimer et al., "SMASH, SENSE, PILS, GRAPPA—How to Choose the Optimal Method," Top Magn Reson Imaging 15: pages 223-236 (2004). Furthermore, this article describes why, in particular, image space-based ppa techniques are affected by so-called infolding artifacts.

In the context of accelerated imaging methods that acquire measurement data from a slice, the term "in-plane" acceleration is also used, which refers to reducing the measurement data acquired within this slice. In the case of SMS methods in which the acceleration takes place by simultaneously acquiring measurement data in multiple slices, the term "through-plane" acceleration is also used.

Both types of acceleration can be combined, for example, in SMS methods with additional "in-plane" acceleration.

In the case of slice multiplexing methods, parallel acquisition techniques are used to separate again the measurement data, which is acquired simultaneously for different slices. In this case, reference measurement data must be acquired for all relevant slices. This generally occurs within the framework of a reference measurement, which is performed in addition and which measures reference measurement data individually for each desired slice.

To be able to separate the resulting signals of the different slices, a different phase is imposed on each of the individual RF pulses, for example, before multiplexing, for example by adding a phase that increases linearly (for example, with the k-space coordinate in the phase encoding direction ($k_y$)). Consequently, a difference phase increase can be imposed on each slice, whereby the slices are shifted with respect to one another in the image space. This shifting is controlled by the so-called FOV (field of view) shift factor.

In CAIPIRINHA methods described in the aforementioned articles by Breuer et al. and Setsompop et al., alternating further phase shifts are imposed between the simultaneously excited slices by switching additional gradient blips or by additionally modulating the phases of the RF pulses of the multi-band RF pulses, which produce shifts in the image space. These additional shifts in the image space improve the quality of the separation of the signals of the slices, particularly if the coil sensitivities have such small differences in the sensitivity profiles of the individual coils used that these are not sufficient for reliable separation of the slices. This reduces artifacts in the image data, ultimately reconstructed from the measured measurement data.

While in ppa techniques, the k-space is undersampled in accordance with a regular sampling pattern which is sampled, for example, only every f-th k-space row which is to be measured according to Nyquist, so-called compressed sensing methods use sampling patterns of the k-space that are as irregular as possible, in particular pseudo-random, and the "missing" measurement data is determined using iterative reconstruction functions with the addition of a-priori knowledge, which can be formulated as boundary conditions of an optimization problem of a reconstruction function. CS and ppa techniques can also be combined.

Furthermore, it has been known for some years now to use trained reconstruction functions, which comprise neural networks, which are based on so-called deep learning (DL) algorithms, to reconstruct image data from measurement data, which is acquired undersampled using magnetic resonance technology. An overview of the principles of ppa, CS, and associated iterative reconstruction functions up to trained reconstruction functions is given in the article by Knoll et al., "Deep-Learning Methods for Parallel Magnetic Resonance Imaging Reconstruction: A Survey of the Current Approaches, Trends, and Issues," IEEE Signal Processing Mag. 37(1)): pages 128-140 (2020). As this survey demonstrates, trained reconstruction methods can be regarded as iterative SENSE-based CS reconstruction methods.

In iterative reconstruction functions, an optimization problem is solved in multiple iterations, especially within the framework of trained reconstruction functions, sometimes called cascades.

The article by Hammernik et al., "Systematic evaluation of iterative deep neural networks for fast parallel MRI reconstruction with sensitivity-weighted coil combination," Magn Reson Med. 86: pages 1859-1872 (2021) compares different trained reconstruction functions.

Despite the improvements mentioned for accelerating the acquisition of measurement data, especially in the case of high acceleration factors of R=4 to R=12 or more, as can be achieved, for example, using trained reconstruction functions, infolding artifacts can still occur in image data which is reconstructed from undersampled acquired measurement data due to the aliasing associated with undersampling.

SUMMARY

An object of the disclosed aspects is to increase the image quality of image data, which is reconstructed from measurement data acquired in an accelerated manner, and to avoid artifacts, particularly infolding artifacts, in such image data.

The object is achieved by a method for creating image data of an examination object using a magnetic resonance system, a magnetic resonance system, a computer program, and an electronically readable data carrier.

A method in accordance with the disclosed aspects for creating image data of an examination object using a magnetic resonance system comprises the steps:
acquiring a first set of measurement data at least of one slice of the examination object,
acquiring at least a second set of measurement data of the same at least one slice of the examination object, wherein the first set of measurement data and each acquired second set of measurement data are respectively acquired using different acceleration factors and/or using different field of view shift factors,
reconstructing image data of the at least one slice based on the first set of measurement data and the second set of measurement data.

Due to the acquisition in accordance with the disclosed aspects of sets of measurement data of the same slices using different acceleration factors and/or using different field of view shift factors, aliasing artifacts and/or shifts which are contained in the different sets of measurement data sets are also positioned differently, in particular differently in the image space. This makes it easier to remove artifacts by a reconstruction based on the common measurement data of the different (first and second) sets of measurement data, thus improving the image quality. Furthermore, acquiring measurement data of the same slices multiple times improves a signal-to-noise ratio (SNR).

A magnetic resonance system in accordance with the disclosed aspects comprises a magnet unit, a gradient unit, a radio-frequency unit, and a control facility, which is designed for performing a method in accordance with the disclosed aspects and comprises an assignment unit.

A computer program in accordance with the disclosed aspects performs a method in accordance with the disclosed aspects on a control facility if said computer program is executed on the control facility. For example, the computer program comprises commands which, when the program is executed by a control facility, such as a magnetic resonance system control facility, cause said control facility to perform a method per the disclosed aspects. The control facility can be configured in the form of a computer.

In this case, the computer program can also be in the form of a computer program product which can be loaded directly into a storage medium of a control facility, having program code means performing a method in accordance with the disclosed aspects of the computer program product is executed in a computing unit of the computer system.

A computer-readable storage medium in accordance with the disclosed aspects comprises commands which, when executed by a control facility, such as a control facility of a magnetic resonance system, cause said control facility to perform a method according to the disclosed aspects.

The computer-readable storage medium can be configured as an electronically readable data carrier that comprises control information that is stored thereon, is electronically readable, and comprises at least one computer program in accordance with the disclosed aspects and which is configured in such a manner that when the data carrier is used in a control facility of a magnetic resonance system, it can perform a method in accordance with the disclosed aspects.

The advantages and aspects disclosed with regard to the method also apply analogously to the magnetic resonance system, the computer program product, and the electronically readable data carrier.

BRIEF DESCRIPTION OF THE DRAWINGS

Further advantages and details of the present disclosed aspects are apparent from the exemplary aspects described below and with the aid of the drawings. The examples given do not constitute a limitation of the disclosed aspects. In the drawings.

DETAILED DESCRIPTION

Figure 1:
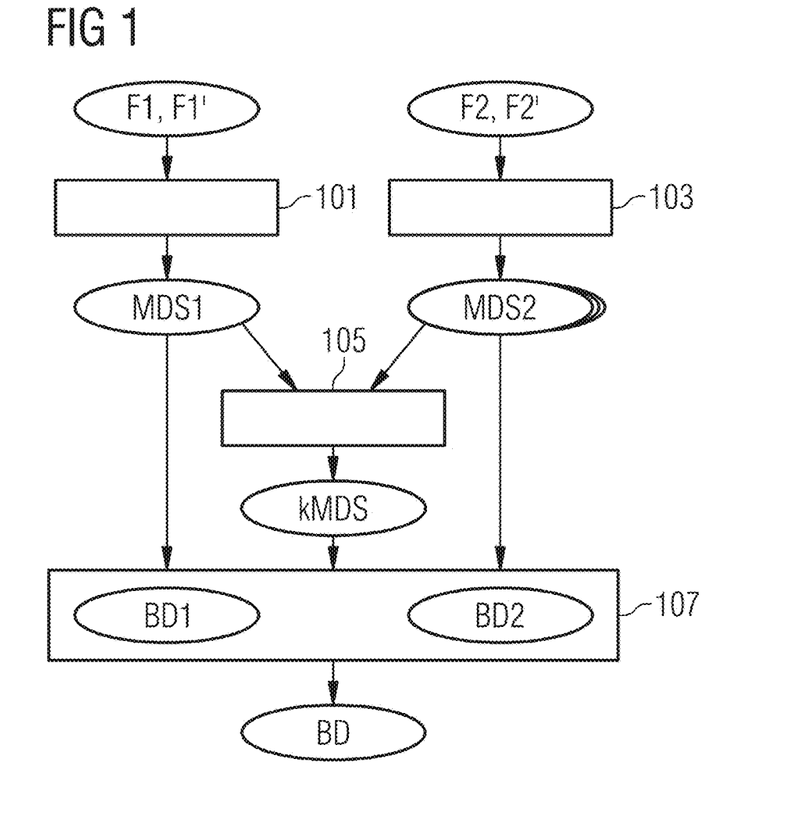
FIG. 1 shows a schematic flow diagram of a method in accordance with the disclosed aspects.

FIG. 1 is a schematic flow diagram of a method in accordance with the disclosed aspects for creating image data of an examination object using a magnetic resonance system.

A first set of measurement data MDS1 is acquired from at least one slice of an examination object using a first acceleration factor F1 and/or a first field of view shift factor F1' with a magnetic resonance system (block 102).

Furthermore, at least one second set MDS2 of measurement data of the same at least one slice of the examination object is acquired using a second acceleration factor F2 and/or a second field of view shift factor F2' (block 103), respectively.

The first acceleration factor F1 and each of the second acceleration factors F2 are different in this case; in other words, each acceleration factor F1 and F2 is used during the acquisition of one, in particular exactly one, of the acquired sets of measurement data MDS1, MDS2. The acceleration factors indicate an undersampling of the k-space, which is applied during the acquisition of the respective sets of measurement data MDS1, MDS2.

Figure 2:
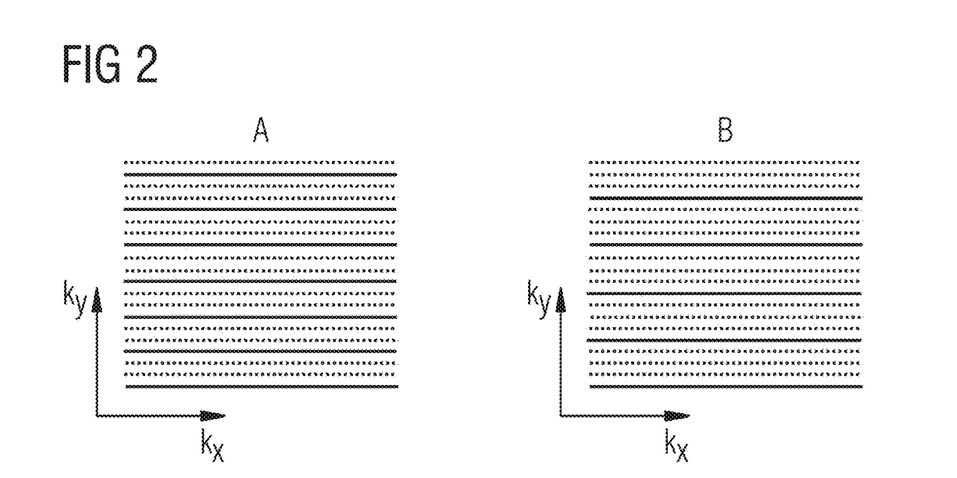
FIG. 2 shows schematically sampling schemes in the k-space with different acceleration factors.

FIG. 2 schematically shows sampling schemes in the k-space using different acceleration factors on examples of an image of k-space rows that run in the readout direction. Acquired k-space rows are illustrated with a continuous line, and non-acquired k-space rows are illustrated with a dotted line. In the sampling scheme illustrated on the left (A), with which, for example, a first set of measurement data can be acquired, every third k-space row of the k-space rows required according to Nyquist for a complete sampling of the k-space is acquired (corresponds to an acceleration factor of three). In the sampling scheme illustrated on the right (B), with which, for example, a second set of measurement data can be acquired, every fourth k-space row of the k-space rows required according to Nyquist for a complete sampling of the k-space is acquired (corresponds to an acceleration factor of four).

Figure 3:
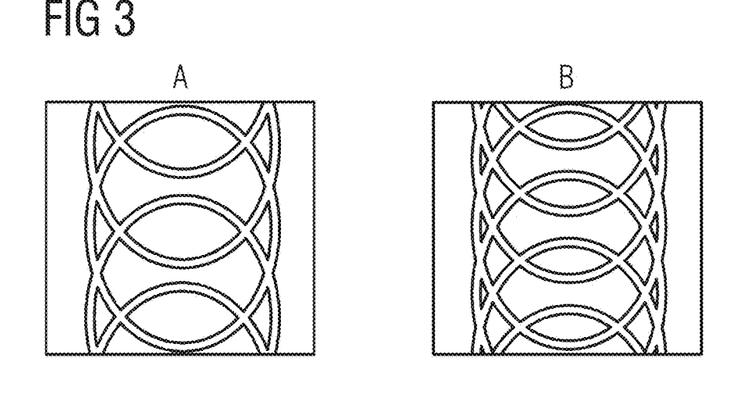
FIG. 3 shows schematic representations of possible aliasing artifacts which correspond to the sampling schemes of FIG. 2.

The aliasing artifacts in the image data, which correspond to the sampling schemes in FIG. 2, are illustrated schematically in FIG. 3. An oval-shaped object appears in the image data (for example, reconstructed from a first set of measurement data) shifted three times with respect to one another by the aliasing using the acceleration factor three (left, A). The same oval-shaped object appears in the image data (for example, reconstructed from a first set of measurement data) shifted four times with respect to one another by the aliasing using the acceleration factor four (right, B). As is apparent, the aliasing artifacts created by the different acceleration factors are located at different positions in the image space. A reduction of artifacts is facilitated by a joint reconstruction of sets of measurement data thus acquired using different acceleration factors due to the different positions of the artifacts. In particular, when a trained reconstruction function is applied to input data that has been generated, for example, as image data which is reconstructed from the first set of measurement data concatenated along one dimension and image data which is reconstructed from the second set of measurement data, an artifact reduction using the trained reconstruction method is facilitated by the different positions of the artifacts in the respective image data.

Likewise, the first field of view shift factor F1' and each of the second field of view shift factors F2' are different; in other words, each acceleration factor F1 and F2 is used only during the acquisition of one of the acquired sets of measurement data MDS1, MDS2. If, during the acquisition of the sets of measurement data MDS1, MDS2, measurement data is simultaneously acquired and collapsed from several slices (using an SMS method), the field of view shift factors F1', F2' indicate a shift by which the image data of the multiple simultaneously measured layers are illustrated shifted with respect to one another in image data which is reconstructed from the collapsed measurement data.

Figure 4:
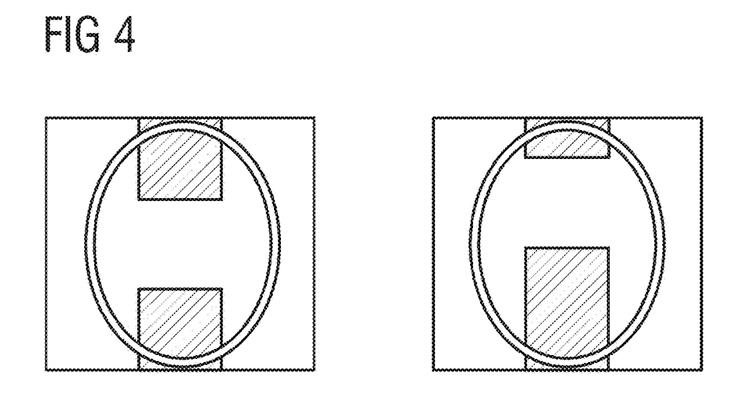
FIG. 4 shows schematic representations of possible shifts that occur in image data, which is reconstructed from measurement data which is acquired using different field-of-view shift factors collapsed from two slices.

FIG. 4 shows schematic representations of possible shifts occurring in image data, which is reconstructed from measurement data and acquired using different field-of-view shift factors collapsed from two slices. In the illustrated example, sets of measurement data were acquired simultaneously from a first layer, which contains an oval object, and a second layer, which contains a rectangular object, wherein a field of view shift factor of two was used during the acquisition of the first set of measurement data, for example, resulting in a shift of the second slice which is overlaid on the first slice by half a field of view (FOV) in the image data which is reconstructed from the first set of measurement data (illustrated on the left). During a further acquisition, for example, of the second set of measurement data, a field of view shift factor of three was used, which in the image data which is reconstructed from the second set of measurement data (illustrated on the right) results in a shift of the second slice which is overlaid on the first slice by one-third of the FOV.

In particular, if an SMS method was used during the acquisition of the first and second sets of measurement data, which produces different contrasts in the simultaneously acquired slices, the different positioning of the second slice, which is overlaid on the first slice, said different positioning being produced by the different field of view shift factors, facilitates a joint RECONSTRUCTION of image data from the first and second sets of measurement data.

Especially in a reconstruction using trained reconstruction functions, different positionings of aliasing artifacts and/or overlays contribute additional information and thus facilitate a joint reconstruction of image data from the first and second sets of measurement data.

For clarity, FIG. 4 illustrates scenarios in which measurement data is acquired simultaneously from two slices ("through-plane" acceleration two). However, the method is not limited to SMS methods with two simultaneously acquired slices. Higher "through-plane" accelerations are analogously conceivable.

If during the acquisition of the sets of measurement data, different acceleration factors and different field-of-view shift factors are used (in other words, both an "in-plane" acceleration and also a "through-plane" acceleration are used), the positions of aliasing artifacts and the positions of the slices which are illustrated shifted and overlaid are varied. This can significantly reduce artifacts, especially when SMS TSE DIXON methods are used. In this case, for example, a first set of measurement data could be acquired using an acceleration factor of two and a field of view shift factor of three. A second set of measurement data could be acquired for this purpose using an acceleration factor of three and using a field of view shift factor of four.

In accordance with the disclosed aspects, at least one further acquisition of a further set of measurement data of the same slice or the same slices is generally carried out as is the case during the acquisition of the first set of measurement data MDS1, wherein, however, respectively different acceleration factors and/or field of view shift factors are used during the respective acquisitions.

Such repeated acquisitions of the same slices do not necessarily lead to an extension of a total measurement time to be spent because they are already required in some known MR methods. For example, to carry out the aforementioned averaging, but also within the framework of known Dixon methods or diffusion imaging methods, it is already necessary to acquire measurement data of the same slices multiple times.

In Dixon methods, sets of measurement data of the same slices are acquired at different echo times in a known manner so that spins of different spin species included in an examination object are in different phase positions with respect to one another in the different acquisitions. A first set of measurement data MDS1 and at least a second set of measurement data MDS2 can thus be measurement data acquired within the framework of a diffusion method with different phase positions.

Within the framework of MR diffusion methods, sets of measurement data of the same slices are acquired using a different diffusion preparation. A first set of measurement data MDS1 and at least a second set of measurement data MDS2 can thus be measurement data acquired within the framework of a diffusion method with different diffusion preparations.

Averaging can be used in particular when MR diffusion methods are used or also when BOLD (blood oxygenating level dependent) methods are used to reduce further artifacts, for example, so-called fat ghosts.

Based on the first set of measurement data MDS1 and the second set of measurement data MDS2, image data BD of the at least one slice is reconstructed (block 107). The image data BD can be displayed, stored, or further processed.

In this case, within the framework of the reconstruction, first image data BD1, BD1* can be reconstructed from the first set of measurement data MDS1 and second image data BD2, BD2* can be reconstructed from the second set of measurement data MDS2 on the basis of which the image data BD of the at least one slice is reconstructed using an image space based reconstruction method.

It is also conceivable that the first set of measurement data MDS1 and the second set of measurement data MDS2 are combined in the k-space to form a combined set of measurement data kMDS, and the image data of the at least one slice is reconstructed from the combined set of measurement data kMDS using a k-space based reconstruction method.

The reconstruction of the image data BD can be performed in particular using a parallel acquisition technique, such as for example GRAPPA or SENSE, or by using a CS method.

It is also conceivable for the reconstruction to use a known trained reconstruction method, wherein the reconstruction of the image data is performed in that a trained reconstruction function is applied to input data, which is based on the acquired first set of measurement data MDS1 and the at least one acquired second set of measurement data MDS2, wherein output data BD which comprises image data BD is determined.

If the first set of measurement data MDS1 and all acquired second sets of measurement data MDS2 (acquired using an SMS method) comprises measurement data from at least two simultaneously acquired slices, the reconstruction can reconstruct image data BD of the individual slices from the measurement data which is simultaneously acquired from the at least two slices.

Averaging of image data, reconstructed from different acquired sets of measurement data MDS1, MDS2, of the same slices, can also be performed to obtain averaged image data and increase an SNR.

In the case of a method in accordance with the disclosed aspects for creating image data of an examination object using a magnetic resonance system, a first and at least a second set of measurement data at least of one slice are acquired, wherein during each acquisition of measurement data different acceleration factors and/or different field of view shift factors are used. Image data is reconstructed based on the acquired sets of measurement data.

By using in accordance with the disclosed aspects different acceleration factors and/or different field of view shift factors in repeated acquisitions of sets of measurement data of the same slices, it is achieved that a position of aliasing artifacts and/or a position of slices illustrated shifted overlaid with respect to one another varies in relation to one another in image data which is reconstructed from the different sets of measurement data. This variation of the said positions provides additional information, facilitating a joint reconstruction of the measurement data sets and reducing artifacts.

Figure 5:
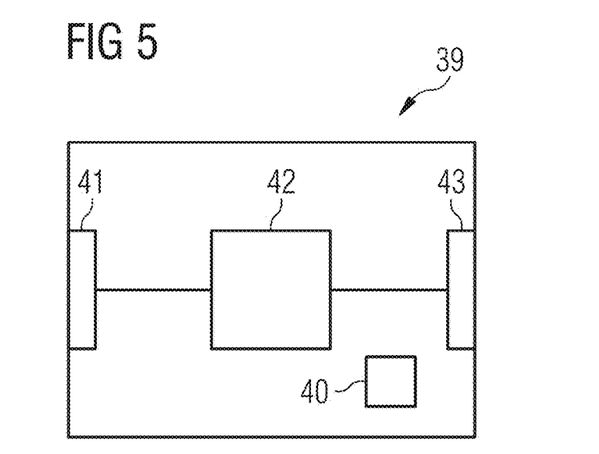
FIG. 5 shows a schematic sketch of a possible reconstruction facility for performing a reconstruction method using a trained reconstruction function.

FIG. 5 shows a schematic sketch of a possible reconstruction facility 39, which is designed to perform a reconstruction method described herein using a trained reconstruction function and can be implemented, for example, as part of an evaluation facility or control facility of a magnetic resonance system, and in particular can serve as part of a post-processing pipeline. The reconstruction facility 39 can also be integrated into other computing facilities or formed by other computing facilities.

To realize function units, the reconstruction facility 39 has at least one processor and at least one storage medium 40. Input data can be received via a first interface 41. A trained reconstruction function is used in a reconstruction unit 42, wherein the output data that is created can be provided at a second interface 43.

Figure 6:
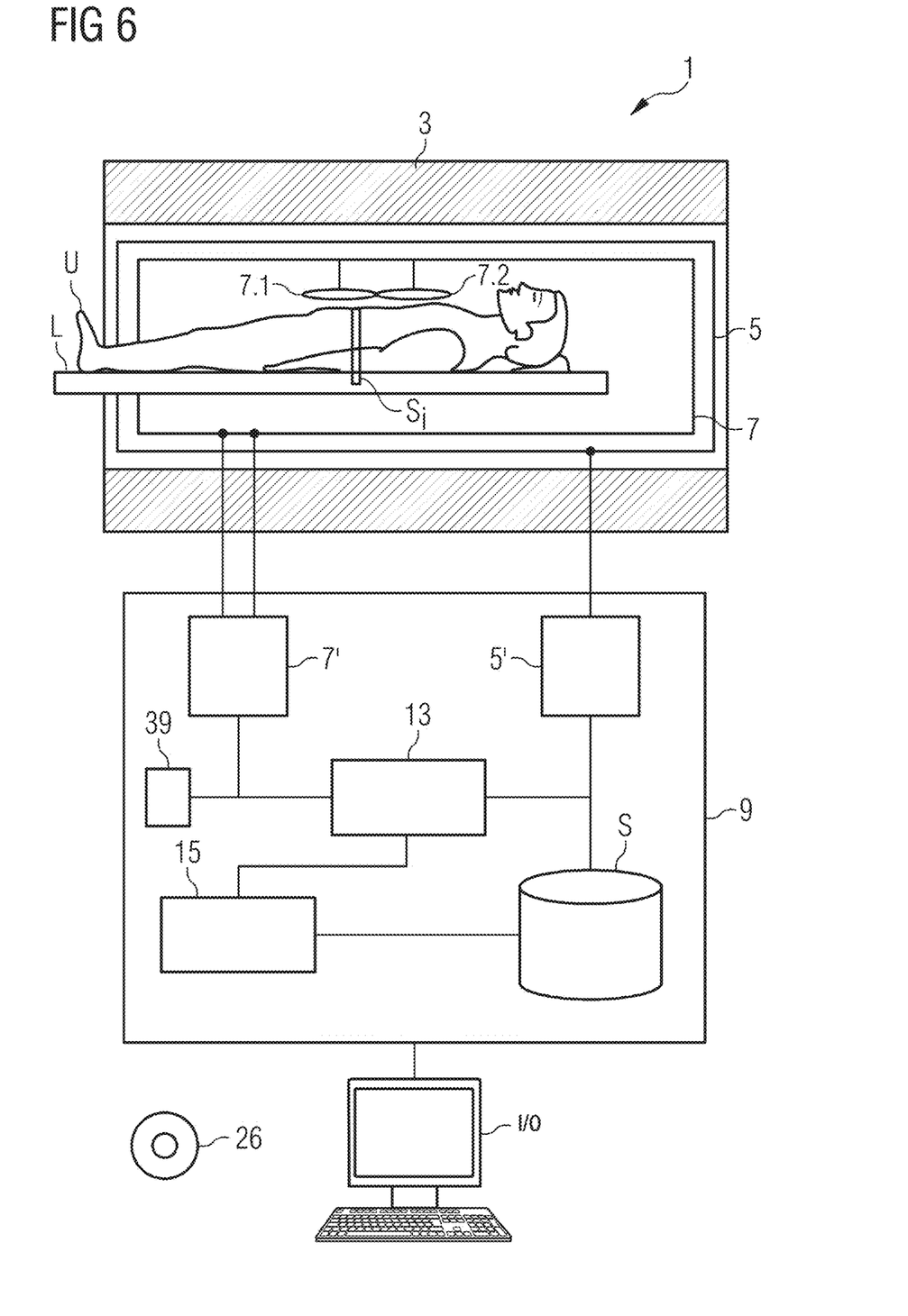
FIG. 6 shows a schematically represented magnetic resonance system in accordance with the disclosed aspects.

FIG. 6 illustrates schematically a magnetic resonance system 1 in accordance with the disclosed aspects. This comprises a magnet unit 3 for generating the basic magnetic field, a gradient unit 5 for generating the gradient fields, a radio-frequency unit 7 for radiating and receiving radio-frequency signals, and a control facility 9, which is designed for performing a method in accordance with the disclosed aspects.

These part units of the magnetic resonance system 1 are only roughly schematically illustrated in FIG. 6. In particular, the radio-frequency unit 7 can consist of multiple sub-units, for example, multiple coils such as the schematically illustrated coils 7.1 and 7.2 or more coils, which can be configured either only for transmitting radio-frequency signals or only for receiving the triggered radio-frequency signals or for both.

To examine an examination object U, such as a patient or a phantom, this can be inserted on a couch L into the magnetic resonance system 1 in its measuring volume. The slice or slab Si represents an exemplary target volume of the examination object from which echo signals are to be received and acquired as measurement data.

The control facility 9 is used to control the magnetic resonance system 1. It can, in particular, control the gradient unit 5 using a gradient control 5' and the radio-frequency unit 7 using a radio-frequency transmit/receive control 7'. In this case, the radio-frequency unit 7 can comprise multiple channels to transmit or receive signals.

The radio-frequency unit 7 together with its radio-frequency transmit/receive control 7' is responsible for generating and radiating (transmitting) a radio-frequency alternating field for manipulating the spins in an area of the examination object U which is to be manipulated (for example, in slices S which are to be measured). The center frequency of the radio-frequency alternating field, also known as the B1 field, is usually set in such a manner that it is as close as possible to the resonance frequency of the spins to be manipulated. Deviations of the center frequency from the resonance frequency are called off-resonance. To generate the B1 field, controlled currents are applied to the HF coils in the radio-frequency unit 7 using the radio-frequency transmit/receive control 7'.

Furthermore, the control facility 9 comprises an assignment unit 15 with which, in accordance with the disclosed aspects, different acceleration factors and/or field of view shift factors can be assigned to different acquisitions of sets of measurement data. The control facility 9 is designed overall to perform a method in accordance with the disclosed aspects. Furthermore, the control facility 9 can comprise a reconstruction unit 39 with which, for example, as described above, it is possible to reconstruct image data from acquired measurement data.

A computing unit 13 comprising the control facility 9 is designed to perform all computing operations necessary for the required measurements and determinations. Intermediate results and results required for this purpose or determined in the process can be stored in a storage unit S of the control facility 9. In this case, the illustrated units are not necessarily to be understood as physically separate units but merely represent a subdivision into logical units, which can, however, also be realized, for example, in fewer or also in only one single physical unit.

Via an input/output facility I/O of the magnetic resonance system 1, control commands can be sent to the magnetic resonance system, for example, by a user, and/or results of the control facility 9, such as image data, can be displayed.

A method described herein can also be a computer program comprising commands that perform the described method on a control facility 9. Likewise, there can be a computer-readable storage medium that comprises commands which, when executed by a control facility 9 of a magnetic resonance system 1 cause said control facility to perform the described method.

The invention claimed is:

1. A method for creating image data of an examination object using a magnetic resonance system, comprising:
  acquiring a first set of measurement data at least of one slice of the examination object;
  acquiring at least a second set of measurement data of the same at least one slice of the examination object, wherein the first set of measurement data and each acquired second set of measurement data are respectively acquired using different acceleration factors and/or using different field of view shift factors; and
  reconstructing image data of the at least one slice based on the first set of measurement data and the second set of measurement data.

2. The method of claim 1, further comprising:
  reconstructing first image data from the first set of measurement data; and
  reconstructing second image data from the second set of measurement data on the basis of which the image data of the at least one slice is reconstructed.

3. The method of claim 1, further comprising:
  combining the first set of measurement data and the second set of measurement data in the k-space to form a combined set of measurement data; and
  reconstructing the image data of the at least one slice from the combined set of measurement data.

4. The method of claim 1, further comprising:
  reconstructing image data using a parallel acquisition technique or a compressed sensing method.

5. The method of claim 1, wherein the reconstruction of the image data comprises:
  applying a trained reconstruction function to input data that is based on the acquired first set of measurement data and the at least one acquired second set of measurement data; and
  determining output data which comprises image data.

6. The method of claim 1, wherein the first set of measurement data and all acquired second sets of measurement data comprise measurement data from at least two simultaneously acquired slices and the reconstruction reconstructs image data of individual slices from the measurement data which is simultaneously acquired from the at least two slices.

7. The method of claim 1, further comprising:
  averaging image data that is reconstructed from different acquired sets of measurement data at least of a same slice to obtain averaged image data.

8. The method of claim 1, wherein the first set of measurement data and at least one second acquired set of measurement data are sets of acquired measurement data acquired within a framework of a Dixon method, in which different spin species which are included in an examination object are in different phase positions with respect to one another.

9. The method of claim 1, wherein the first set of measurement data and at least one second acquired set of measurement data are measurement data acquired within a diffusion method framework.

10. A magnetic resonance system, comprising:
   a magnet unit;
   a gradient unit;
   a radio-frequency unit; and
   a control facility, comprising:
      a radio-frequency transmit/receive control; and
      an assignment unit,
      wherein the control facility is designed to perform a method of claim 1 on the magnetic resonance system.

11. A non-transitory computer-readable storage medium comprising commands which when executed by a control facility of a magnetic resonance system cause the control facility to perform the method of claim 1.

\* \* \* \* \*